US011251450B2

(12) United States Patent
Ryu (10) Patent No.: US 11,251,450 B2
(45) Date of Patent: Feb. 15, 2022

(54) CONTROL SYSTEM AND CONTROL METHOD FOR FUEL CELL COOLING (71) Applicants: Hyundai Motor Company, Seoul (KR); Kia Motors Corporation, Seoul (KR)

(72) Inventor: Jung Hwan Ryu, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/742,499

(22) Filed: Jan. 14, 2020

(65) Prior Publication Data

US 2021/0036349 A1 Feb. 4, 2021

(30) Foreign Application Priority Data

Aug. 2, 2019 (KR) .................. 10-2019-0094519

(51) Int. Cl.
*H01M 8/04701* (2016.01)
*H01M 8/04007* (2016.01)
*H01M 8/0432* (2016.01)
*H01M 8/04029* (2016.01)
*H01M 8/0267* (2016.01)

(52) U.S. Cl.
CPC ..... *H01M 8/04723* (2013.01); *H01M 8/0267* (2013.01); *H01M 8/04029* (2013.01); *H01M 8/04067* (2013.01); *H01M 8/04358* (2013.01)

(58) Field of Classification Search
CPC ........... H01M 8/04723; H01M 8/0267; H01M 8/04029; H01M 8/04067
See application file for complete search history.

(56) References Cited

U.S. PATENT DOCUMENTS

| 2005/0282050 | A1* | 12/2005 | Zanoni | H01M 8/04059 429/435 |
| 2007/0204984 | A1* | 9/2007 | Limbeck | H01M 8/04723 165/202 |
| 2016/0126565 | A1* | 5/2016 | Kwon | H01M 8/04731 429/437 |
| 2018/0287175 | A1* | 10/2018 | Lee | H01M 8/04007 |

FOREIGN PATENT DOCUMENTS

| JP | 2016-134337 A | 7/2016 |
| KR | 10-1628514 B1 | 6/2016 |

* cited by examiner

*Primary Examiner* — Olatunji A Godo
(74) *Attorney, Agent, or Firm* — Mintz Levin Cohn Ferris Glovsky and Popeo, P.C.; Peter F. Corless (57) ABSTRACT A control system for fuel cell cooling is provided. The system includes a fuel cell stack, a coolant circulation line connected to the fuel cell stack, and a heat exchange device provided in the coolant circulation line. A bypass line bypasses the heat exchange device. A temperature adjusting device adjusts a ratio between coolant flowing into the heat exchange device of the coolant circulation line and coolant flowing into the bypass line. A temperature estimator estimates a temperature of the coolant of the coolant circulation line at a point before the bypass line joins the coolant circulation line after the coolant passes through the heat exchange device. An opening degree controller operates the temperature adjusting device using the temperature of the coolant estimated by the temperature estimator and the temperature of the coolant at a point at which the coolant flows into the fuel cell stack.

14 Claims, 5 Drawing Sheets

CONTROL SYSTEM AND CONTROL METHOD FOR FUEL CELL COOLING

CROSS REFERENCE TO RELATED APPLICATION

The present application claims priority to Korean Patent Application No. 10-2019-0094519, filed Aug. 2, 2019, the entire contents of which is incorporated herein for all purposes by this reference.

BACKGROUND

1. Technical Field

The present disclosure relates to a technology for cooling a fuel cell, and more particularly, to a technology for cooling a fuel cell by estimating a temperature of a coolant at a radiator outlet and adjusting flow of the coolant based on the estimated temperature of the coolant.

2. Description of the Related Art

A fuel cell, which converts chemical energy into electrical energy using an oxidation-reduction reaction of hydrogen and oxygen respectively supplied from a hydrogen supply device and an air supply device, includes a fuel cell stack that produces electrical energy, a cooling system that cools the fuel cell stack, and the like. In other words, when hydrogen is supplied to an anode of a fuel cell stack, hydrogen is oxidized in the anode to generate protons and electrons, and the generated protons and electrons are transferred to a cathode through an electrolyte membrane and a separator. In the cathode, water is produced through an electrochemical reaction of the protons and the electrons transferred from the anode and oxygen in the air, and electric energy is produced from flow of the electrons.

By such a chemical reaction, the fuel cell stack generates heat energy together with electrical energy. The fuel cell stack includes a cooling system to prevent problems such as overheating due to thermal energy which deteriorates the fuel cell stack. In particular, a water cooling type cooling system that cools the fuel cell stack by forming a cooling flow path through which coolant flows between unit cells included in the fuel cell stack has been developed.

In such a cooling system, it is difficult to directly measure a temperature of the fuel cell stack and the temperature of the stack is indirectly estimated using an outlet temperature of a coolant discharged through the fuel cell stack. In addition, a cooling amount of the fuel cell stack is adjusted by operating a thermostat that adjusts a ratio between coolant which has passed through a radiator and coolant which has bypassed the radiator based on an estimated temperature of the fuel cell stack or by operating a pump that generates the coolant flow.

In other words, the fuel cell stack is cooled by mixing the coolant flowing into the thermostat after passing through the radiator and the coolant which has bypassed the radiator. However, low-temperature coolant passing through the radiator may flow into the fuel cell stack, and thus a thermal shock occurs in the fuel cell stack. In addition, when a relatively small amount of heat is generated in the fuel cell stack, requiring a small amount of heat dissipation, the radiator is unable to maintain heat dissipation performance, and thus, if the required amount of heat dissipation of the fuel cell stack increases again, time is delayed to exert cooling performance of the cooling system.

The contents described as the related art have been provided merely to assist in understanding the background of the present disclosure and should not be considered as corresponding to the related art known to those having ordinary skill in the aft.

SUMMARY

An object of the present disclosure is to provide a technique of controlling a cooling system for adjusting a temperature of a coolant flowing into a fuel cell by estimating a temperature of the coolant at an outlet of a radiator and maintaining heat dissipation performance at the radiator.

According to an exemplary embodiment of the present disclosure, a control system for fuel cell cooling may include: a fuel cell stack that allows hydrogen and oxygen to flow thereinto and react with each other, and that may include a cooling flow path in which coolant flows between separators; a coolant circulation line connected to the cooling flow path of the fuel cell stack and that allows coolant to flow therein; a heat exchange device disposed in the coolant circulation line and configured to cool coolant of the coolant circulation line through heat-exchange with the outside; a bypass line branched from the coolant circulation line at a point before coolant flows into the heat exchange device and joining the coolant circulation line by bypassing the heat exchange device; a temperature adjusting device disposed at a point where the bypass line is branched from the coolant circulation line or a point where the bypass line joins the coolant circulation line and configured to adjust a ratio between coolant flowing into the heat exchange device of the coolant circulation line and coolant flowing into the bypass line; a temperature estimator configured to estimate a temperature of the coolant of the coolant circulation line at a point before the bypass line joins the coolant circulation line after the coolant passes through the heat exchange device; and an opening degree controller configured to operate the temperature adjusting device using the temperature of the coolant estimated by the temperature estimator and the temperature of the coolant at a point at which the coolant flows into the fuel cell stack.

The control system may further include: a first temperature sensor and a second temperature sensor. The sensors are disposed at a point where a coolant flows into the fuel cell stack of the coolant circulation line and a point where a coolant has passed the fuel cell stack, respectively, and configured to sense a temperature of the coolant.

The temperature estimator may be configured to estimate the temperature of the coolant using a temperature of the coolant at the point where the coolant flows into the fuel cell stack of the coolant circulation line and at the point where the coolant has passed the fuel cell stack measured by the first temperature sensor and the second temperature sensor, respectively, and a ratio between the coolant flowing into the heat exchange device and the coolant flowing into the bypass line. The temperature adjusting device may be an electronic thermostat, the ratio between the coolant flowing into the heat exchange device and the coolant flowing into the bypass line and mixed may be varied by adjusting the opening degree, and the ratio of the coolant passing through the heat exchange device may increase as the opening degree is increased.

The opening degree controller may be configured to set a control gain for operating the temperature adjusting device based on the temperature of the coolant at the point where the coolant has passed through the heat exchange device estimated by the temperature estimator, and operate the temperature adjusting device using the set control gain to adjust the temperature of the coolant flowing into the fuel cell stack to correspond to a predetermined target temperature. The opening degree controller may be configured to set the control gain to be smaller as the temperature of the coolant estimated by the temperature estimator decreases. The opening degree controller may also be configured to set the control gain to be larger as the temperature of the coolant estimated by the temperature estimator increases.

The control system may further include: a cooling fan rotated to cause ambient air of the heat exchange device to flow; and a cooling controller configured to adjust revolutions per minute (RPM) of the cooling fan to adjust a temperature difference between the temperature of the coolant estimated by the temperature estimator and the temperature of the coolant at the point where the coolant passes through the fuel cell stack to be equal to or greater than a predetermined temperature difference. The control system may further include: a cooling pump disposed in the coolant circulation line and configured to circulate the coolant inside the coolant circulation line when operated; and a cooling controller configured to adjust the RPM of the cooling pump based on the temperature of the coolant at the point where the coolant has passed through the fuel cell stack.

According to another exemplary embodiment of the present disclosure, a control method for fuel cell cooling may include: sensing temperatures of coolants of the coolant circulation line at a point where the coolant flows into a fuel cell stack and at a point where the coolant has passed through the fuel cell stack; estimating a temperature of a coolant of the coolant circulation line which has passed through the heat exchange device at a point before a bypass line which bypasses the heat exchange device joins based on the sensed temperatures of the coolants at the point where the coolant flows into the fuel cell stack and at the point where the coolant has passed through the fuel cell stack; and operating a temperature adjusting device configured to adjust a ratio between the coolants respectively flowing into the heat exchange device of the coolant circulation line and the bypass line using the estimated temperature of the coolant and the temperature of the coolant flowing into the fuel cell stack.

The estimating of the temperature of the coolant may include: estimating the temperature of the coolant at the point where the coolant has passed through the heat exchange device using the ratio between the coolants respectively flowing into the heat exchange device of the coolant circulation line and the bypass line. The operating of the temperature adjusting device may include: setting a control gain for operating the temperature adjusting device based on the temperature of the coolant at the point where the coolant has passed through the heat exchange device estimated by the temperature estimator, and operating the temperature adjusting device using the set control gain to adjust the temperature of the coolant flowing into the fuel cell stack to correspond a predetermined target temperature.

The control gain may be set to be smaller as the temperature of the coolant estimated by the temperature estimator decreases. Additionally, the control gain may be set to be larger as the temperature of the coolant estimated by the temperature estimator increases. The control method may further include: adjusting revolutions per minute (RPM) of a cooling fan to adjust a temperature difference between the estimated temperature of the coolant and the temperature of the coolant at the point where the coolant passes through the fuel cell stack to be equal to or greater than a predetermined temperature difference, after estimating of the temperature of the coolant. The control method may further include: adjusting the RPM of a cooling pump circulating coolant of the coolant circulation line based on the temperature of the coolant at the point where the coolant has passed through the fuel cell stack, after sensing the temperatures of the coolants.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural or functional descriptions of the exemplary embodiments of the present disclosure disclosed in the specification are exemplified for the purpose of describing the exemplary embodiments of the present disclosure only, and the exemplary embodiments of the present disclosure may be carried out in various forms and should not be construed to limit the exemplary embodiments described herein.

In the present disclosure, various modifications may be applied and various forms may be realized, and thus specific exemplary embodiments will be exemplified in the drawings and be described in detail in the specification. However, the present disclosure is not intended to specific disclosure forms, and it will be appreciated that the present disclosure includes all changes, equivalents, or replacements included in the spirit and technical range of the present disclosure.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

When it is mentioned that a certain element is "connected to" or "electrically connected to" a second element, the first element may be directly connected or electrically connected to the second element, but it should be understood that a third element may intervene therebetween. On the other hand, when it is mentioned that a certain element is "directly connected to" or "directly electrically connected to" a second element, it should be understood that there is no third element therebetween. The other expressions for describing a relationship between constituent elements such as "between" and "directly between, or "adjacent to" and "directly adjacent to" are construed in the same way.

The terms used in the application are used to describe specific exemplary embodiments only and are not intended to limit the present disclosure. A singular expression includes a plural expression as long as they are clearly distinguished in the context. Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

Hereinafter, exemplary embodiments of the present disclosure will be described in detail with reference to the accompanying drawings. The same constituent elements in the drawings are denoted by the same reference numerals.

Figure 1:
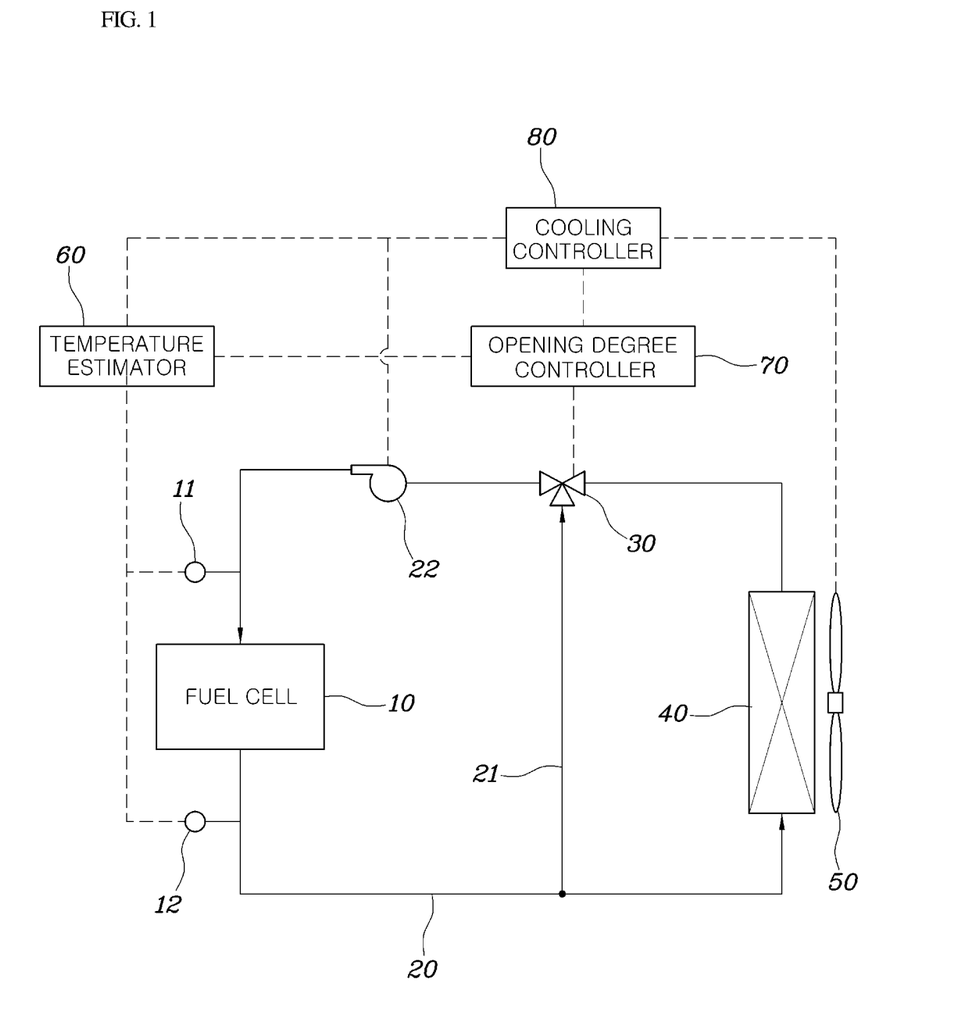
FIG. 1 is a block diagram of a control system of fuel cell cooling according to an exemplary embodiment of the present disclosure.
Figure 2:
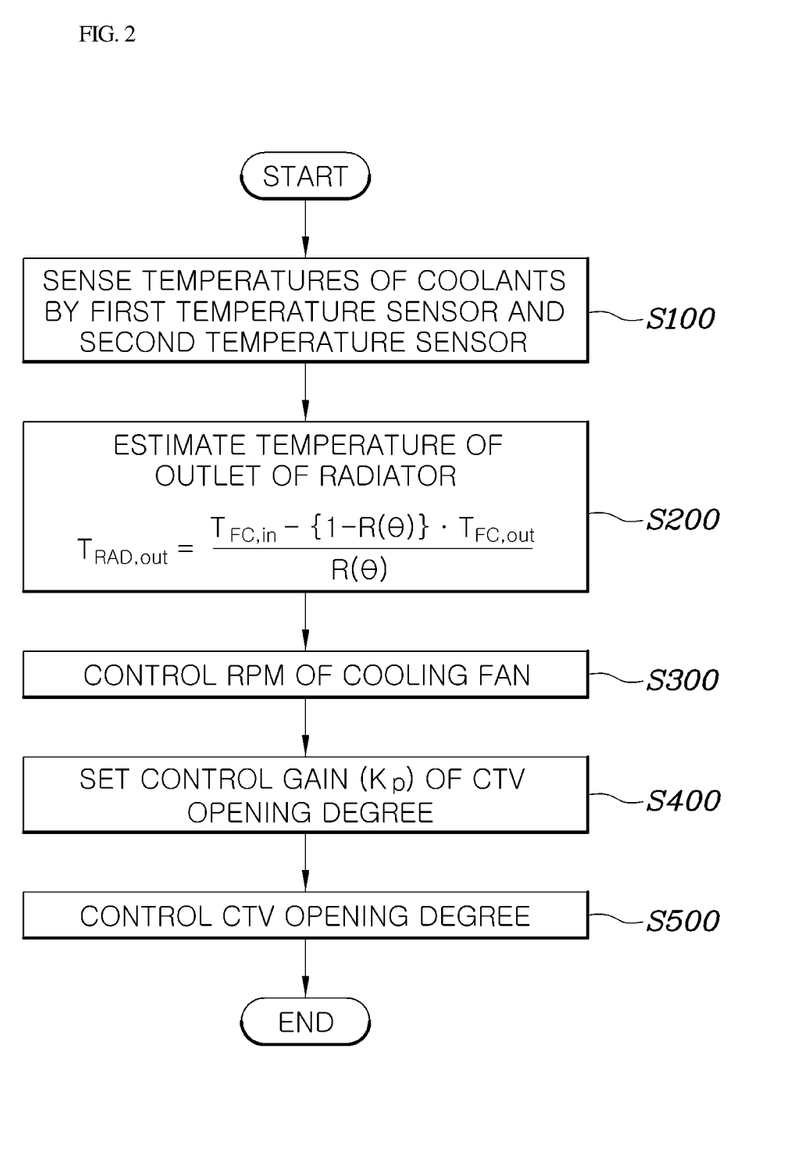
FIG. 2 is a flowchart of a control method of fuel cell cooling according to an exemplary embodiment of the present disclosure.

FIG. 1 is a block diagram of a control system of fuel cell cooling according to an exemplary embodiment of the present disclosure, and FIG. 2 is a flowchart of a control method of fuel cell cooling according to an exemplary embodiment of the present disclosure. Referring to FIGS. 1 and 2, a control system for fuel cell cooling according to an exemplary embodiment of the present disclosure may include: a fuel cell stack 10 that allows hydrogen and oxygen to flow thereinto and react with each other, and having a cooling flow path in which coolant flows between separators; and a coolant circulation line 20 connected to the cooling flow path of the fuel cell stack and that allows coolant to flow therein; a heat exchange device 40 disposed in the coolant circulation line 20 and configured to cool coolant of the coolant circulation line 20 through heat-exchange with the outside; a bypass line 21 branched from the coolant circulation line 20 at a point before coolant flows into the heat exchange device 40 and joining the coolant circulation line 20 by bypassing the heat exchange device 40.

Additionally, the system may include a temperature adjusting device 30 disposed at a point where the bypass line 21 is branched from the coolant circulation line 20 or a point where the bypass line 21 joins the coolant circulation line 20 and configured to adjust a ratio between coolant flowing into the heat exchange device 40 of the coolant circulation line 20 and coolant flowing into the bypass line 21; a temperature estimator 60 configured to estimate a temperature of the coolant of the coolant circulation line 20 at a point before the bypass line 21 joins the coolant circulation line 20 after the coolant passes through the heat exchange device 40; and an opening degree controller 70 configured to operate the temperature adjusting device 30 using the temperature of the coolant estimated by the temperature estimator 60 and the temperature of the coolant at a point at which the coolant flows into the fuel cell stack 10.

The fuel cell stack 10 receives hydrogen and air from a unit cell included therein and is configured to generate electric energy through a chemical reaction therein. Thermal energy is produced inside the fuel cell stack 10 according to the chemical reaction between hydrogen and oxygen, and the fuel cell stack 10 should be operated at an appropriate temperature range for durability and power generation performance. In particular, the fuel cell stack 10 includes separators formed between unit cells included therein and may be cooled as coolant flows along a cooling flow path between the separators.

The coolant circulation line 20, a line in which coolant flows to circulate, may be connected to the cooling flow path of the fuel cell stack 10. The coolant circulation line 20 may include components such as the heat exchange device 40, a cooling pump, a cooling fan 50, and the like, as described hereinafter. The heat exchange device 40 is a heat dissipator configured to dissipate heat of the coolant contained in the coolant circulation line 20 to the outside. The heat exchange device 40 may be a radiator. A heat dissipation fan may further be disposed at a position adjacent to the heat exchange device 40. The coolant of the coolant circulation line 20 may be heat-exchanged with the outside, while passing through the heat exchange device 40 to be cooled.

The bypass line 21 is provided to increase a temperature of the coolant or appropriately maintain a temperature of the coolant. Additionally, the bypass line 21 may branch from the coolant circulation line 20 at a point before flowing into the heat exchange device 40, and may join the coolant circulation line 20 by bypassing the heat exchange device 40. The temperature adjusting device 30 may be configured to adjust a flow rate of the coolant of the coolant circulation line 20 which has passed through the bypass line 21 and the heat exchange device 40. In other words, the temperature adjusting device 30 may be disposed at a point at which the bypass line 21 branches from the coolant circulation line or at a point at which the bypass line 21 joins the coolant circulation line 20, and may be configured to adjust a ratio between coolant flowing into the heat exchange device 40 and the bypass line 21 of the coolant circulation line 20.

The temperature estimator 60 may be configured to estimate a temperature of the coolant of the coolant circulation line 20 at a point before the bypass line 21 joins the coolant circulation line 20 after passing through the heat exchange device 40. In other words, the temperature estimator may be configured to estimate the temperature immediately after the coolant passes through the heat exchange device 40. Particularly, the temperature of the coolant cooled by passing through the heat exchange device 40 may be estimated using the value measured in the existing system without adding a temperature sensor for directly measuring the temperature.

Additionally, the opening degree controller 70 may be configured to operate the temperature adjusting device 30 using the temperature of the coolant estimated by the temperature estimator 60 and the temperature of the coolant at the point where the coolant flows into the fuel cell stack 10. Particularly, the opening degree controller 70 may be configured to operate the temperature adjusting device 30 to adjust a ratio between the coolant which has passed through the heat exchange device 40 and the coolant which has bypassed the heat exchange device 40 through the bypass line 21, thereby adjusting the temperature of the coolant flowing into the fuel cell stack 10.

In particular, the temperature of the coolant estimated by the temperature estimator 60 may be used to measure the temperature of the coolant at the point where the coolant flows into the fuel cell stack 10 and adjust the temperature of the coolant to follow a target temperature. Accordingly, since the temperature of the coolant which has passed through the heat exchange device 40 is used in adjusting the temperature of the coolant flowing into the fuel cell stack 10, the temperature of the coolant flowing into the fuel cell stack 10 may be prevented from being changed rapidly. In addition, a thermal shock may be prevented from occurring in the fuel cell stack 10, thereby improving durability of the fuel cell stack 10.

In addition, the control system may further include a first temperature sensor 11 and a second temperature sensor 12 disposed at a point where the coolant flows into the fuel cell stack 10 of the coolant circulation line 20 and at a point where the coolant passes through the fuel cell stack to sense temperatures of the coolants, respectively. The first temperature sensor 11 may be configured to sense the temperature of the coolant at the point where the coolant flows into the fuel cell stack 10. The second temperature sensor 12 may be configured to sense the temperature of the coolant at the point where the coolant has passed through the fuel cell stack 10 and is discharged from the fuel cell stack 10.

In addition, since there are limitations in directly measuring the temperature of the fuel cell stack 10, the temperature of the fuel cell stack 10 may be estimated using the temperatures of the coolants measured by the first temperature sensor 11 or the second temperature sensor 12. In particular, the temperature of the fuel cell stack 10 may be estimated using the temperature of the coolant passing through the fuel cell stack 10 measured by the second temperature sensor 12. The temperature estimator 60 may be configured to estimate the temperature of the coolant using ratio between the temperature of the coolant at the point where the coolant flows into the fuel cell stack 10 of the coolant circulation line 20 and the temperature of the coolant at the point where the coolant has passed through the fuel cell stack 10, measured by the first temperature sensor 11 and the second temperature sensor 12, respectively, and the coolant flowing to each of the heat exchange device 40 and the bypass line 21.

In particular, the temperature estimator 60 may be configured to estimate the temperature of the coolant on the assumption that a heat quantity is conserved at an inlet and an outlet of the temperature adjusting device 30. The following formula may be established by conservation of heat quantity.

$$\dot{q}_{ctv,out} = \dot{q}_{bypass} + \dot{q}_{rad}$$

$$\dot{m}_{ctv,out} T_{ctv,out} = \dot{m}_{bypass} T_{stack,out} + \dot{m}_{rad} T_{rad,out}$$

$$\dot{m}_{ctv,out} T_{stack,in} = \dot{m}_{bypass} T_{stack,out} + \dot{m}_{rad} T_{rad,out}$$

wherein, $\dot{q}_{ctv,out}$ is a heat quantity (flow rate) of the coolant discharged from the temperature adjusting device 30, $\dot{q}_{bypass}$ is a heat quantity (flow rate) of the coolant flowing into the temperature adjusting device 30 through the bypass line 21, and $\dot{q}_{rad}$ is a heat quantity (flow rate) of the coolant flowing into the temperature adjusting device 30 through the heat exchange device 40.

In addition, is the above equation, $\dot{m}_{ctv,out}$ is a mass (flow rate) of the coolant discharged from the temperature adjusting device 30, $\dot{m}_{bypass}$ is a mass (flow rate) of the coolant flowing into the temperature adjusting device 30 through the bypass line 21, and $\dot{m}_{rad}$ is a mass (flow rate) of the coolant flowing into the temperature adjusting device 30 through the heat exchange device 40. $T_{rad,out}$ is the temperature of the coolant flowing into the temperature adjusting device 30 through the heat exchange device 40, $T_{stack,out}$ discharged through the fuel cell stack 10, which is sensed by the second temperature sensor 12. $T_{ctv,out}$ is the temperature of the coolant discharged from the temperature adjusting device 30, which may be assumed to be equal to the temperature ($T_{stack,in}$) of the coolant flowing into the fuel cell stack 10, which is sensed by the first temperature sensor 11.

Further, the mass of the coolant discharged from the temperature adjusting device 30 may be the sum of the mass of the coolant flowing into the temperature adjusting device 30 through the bypass line 21 and the mass of the coolant flowing into the temperature adjusting device 30 through the heat exchange device 40, and the mass may be represented by a mass ratio ($R(\theta)$) of the coolants respectively flowing into the heat exchange device 40 and the bypass line 21 and mixed according to an opening degree ($\theta_{ctv}$) of the temperature adjusting device 30.

$$\dot{m}_{ctv,out} = \dot{m}_{bypass} + \dot{m}_{rad}$$

$$\dot{m}_{bypass} = (1 - R(\theta)) \times \dot{m}_{ctv,out}$$

$$\dot{m}_{rad} = R(\theta) \times \dot{m}_{ctv,out}$$

In particular, the mass ratio ($R(\theta)$) between the coolants respectively flowing into the heat exchange device 40 and the bypass line 21 and mixed may be pre-mapped between 0 and 1 based on the opening degree ($\theta_{ctv}$) of the temperature adjusting device 30. Therefore, the following equation may be induced by summarizing the equations regarding the temperature of the coolant flowing into the temperature adjusting device 30 through the heat exchange device 40. The temperature of the coolant flowing into the temperature adjusting device 30 through the heat exchange device 40 may be estimated by the following equation.

$$T_{rad,out} = \frac{T_{stack,in} - (1 - R(\theta)) \times T_{stack,out}}{R(\theta)}$$

The temperature adjusting device 30 is an electronic thermostat, the ratio between the coolants respectively flowing into the heat exchange device 40 and the bypass line 21 and mixed may be varied by adjusting the opening degree ($\theta_{ctv}$), and the proportion of the coolant passing through the heat exchange device 40 may be increased as the opening degree ($\theta_{ctv}$) increases. The temperature adjusting device 30 may be represented as a coolant temperature control valve (CTV).

Particularly, the opening degree ($\theta_{CTV}$) refers to the opening degree ($\theta_{CTV}$) to open the coolant circulation line 20 side in which the coolant which has passed through the heat exchange device 40 flows, and accordingly, as the proportion of the coolant which has passed through the heat exchange device 40 increases, the proportion of the coolant flowing to the bypass line 21 and mixed decreases.

Figure 3:
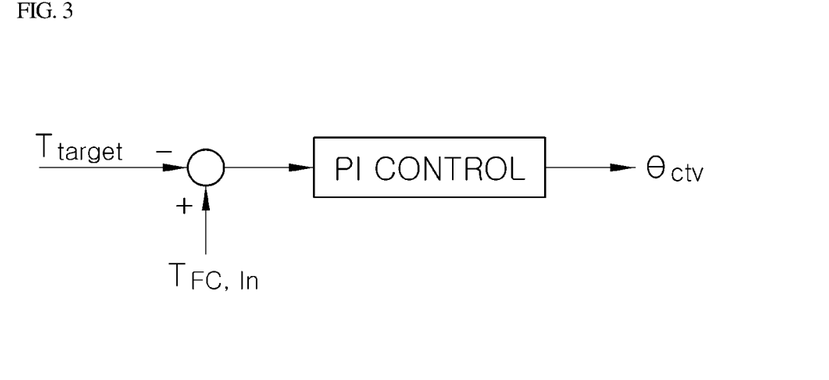
FIG. 3 shows controlling of an opening degree controller according to an exemplary embodiment of the present disclosure.

FIG. 3 shows control of the opening degree controller 70 according to an exemplary embodiment of the present disclosure. Referring further to FIG. 3, the opening degree controller 70 may be configured to set a control gain Kp for operating the temperature adjusting device 30 based on the temperature of the coolant at the point where the coolant has passed through the heat exchange device 40 estimated by the temperature estimator 60, and operate the temperature adjusting device 30 to adjust the temperature of the coolant at the point where the coolant flows into the fuel cell stack 10 to correspond to or reach a predetermined target temperature using the set control gain Kp.

In an exemplary embodiment, the opening degree controller 70 may be configured to operate the temperature adjusting device 30 through proportional integral (PI) control. In particular, the opening degree controller 70 may be configured to adjust the temperature of the coolant at the point where the coolant flows into the fuel cell stack 10 to reach the predetermined target temperature. The temperature of the coolant at the point where the coolant flows into the fuel cell stack 10 may be the value sensed by the first temperature sensor 11 and may be previously set to an appropriate operation temperature, for example, 40 [° C.], of the fuel cell stack to prevent the occurrence a thermal shock in the fuel cell stack 10.

Figure 4:
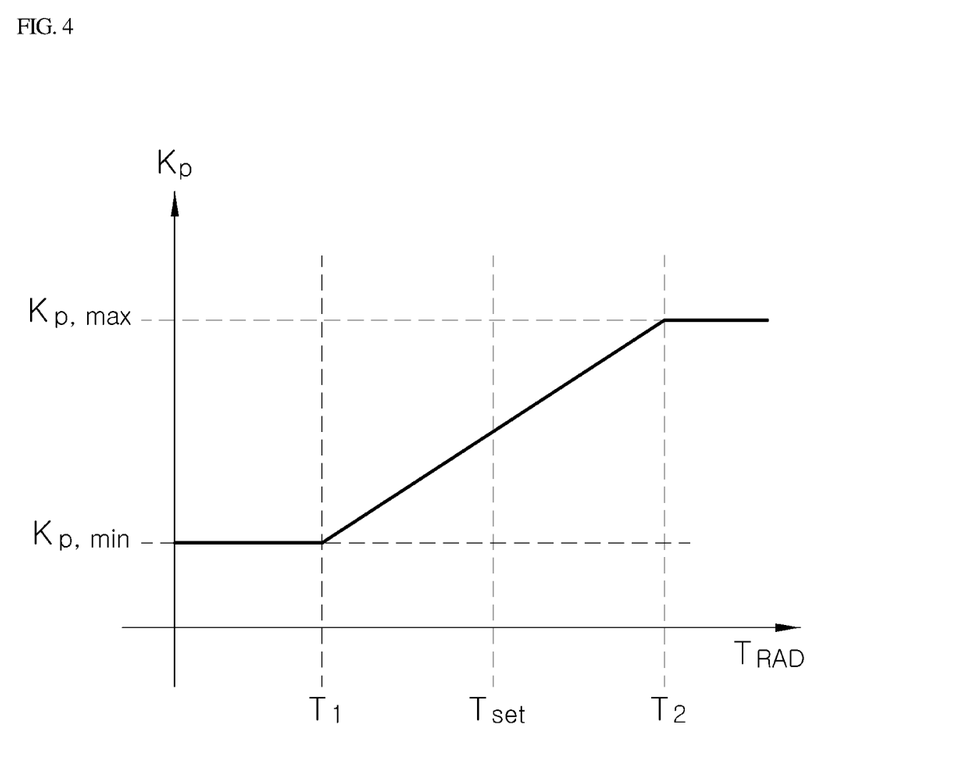
FIGS. 4 and 5 are graphs showing a relationship between a temperature of a coolant at a point where the coolant passes through a heat exchange device and a control gain Kp for controlling a temperature adjusting device according to an exemplary embodiment of the present disclosure.
Figure 5:
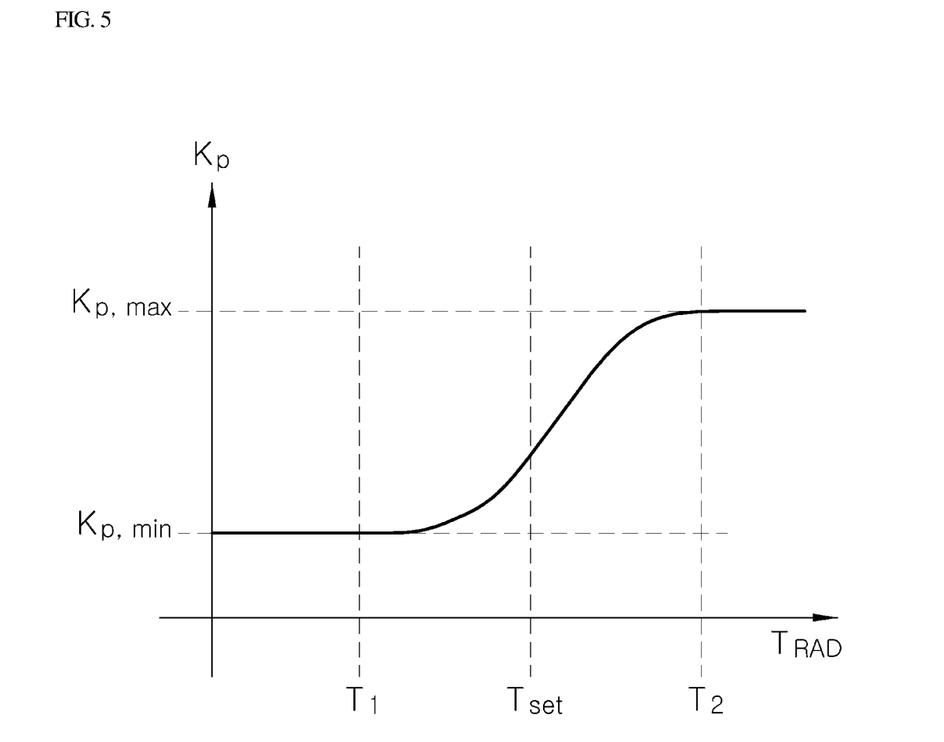

FIGS. 4 and 5 are graphs showing a relationship between the temperature of the coolant at the point where the coolant has passed through the heat exchange device 40 and the control gain Kp for operating the temperature adjusting device 30 according to an exemplary embodiment of the present disclosure. Referring to FIGS. 4 and 5, the opening degree controller 70 may be configured to set the control gain Kp to be smaller as the temperature of the coolant estimated by the temperature estimator 60 decreases.

In addition, the opening degree controller 70 may be configured to set the control gain Kp to be larger as the temperature of the coolant estimated by the temperature estimator 60 increases. The control gain Kp may be set to be proportional to the temperature of the coolant at the point where the coolant has passed through the heat exchange device 40 estimated by the temperature estimator 60. In an exemplary embodiment, an upper limit and a lower limit of the control gain Kp may be set, proportional to the temperature of the coolant at the point where the coolant has passed through the heat exchange device 40 in a specific temperature range T1 to T2, and a range higher or lower than the specific temperature range may be set to the upper limit Kp,max or the lower limit Kp,min.

Accordingly, when the temperature of the coolant at the point where the coolant has passed through the heat exchange device 40 is relatively low (for example, cold temperature close to 0° C., which is lower than the normal operating temperature of the fuel cell), the opening degree of the temperature adjusting device 30 may be prevented from being changed rapidly, and when the temperature of the coolant at the point where the coolant has passed through the heat exchange device 40 is relatively high (for example, hot temperature close to 100° C., which is higher than the normal operating temperature of the fuel cell), the opening degree of the temperature adjusting device 30 may be rapidly changed, thereby obtaining an effect of quickly adjusting the temperature.

Figure 6:
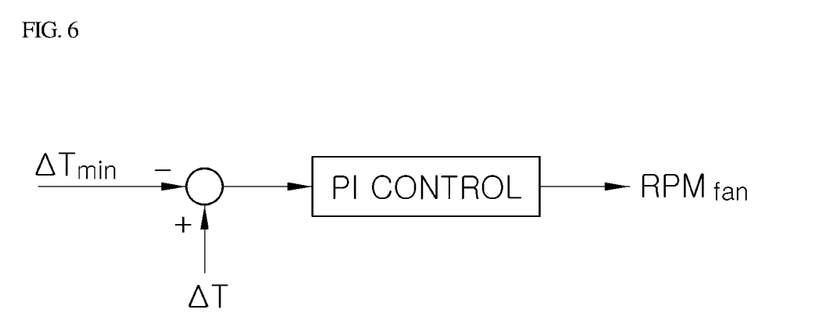
FIG. 6 shows controlling of a cooling fan according to an exemplary embodiment of the present disclosure.

FIG. 6 shows control of the cooling fan 50 according to an exemplary embodiment of the present disclosure. Referring to FIG. 6, the control system may further include: a cooling fan 50 allowing the ambient air of the heat exchange device 40 to flow; and a cooling controller 80 configured to adjust revolutions per minute (RPM) of the cooling fan 50 to adjust a temperature difference between the temperature of the coolant estimated by the temperature estimator 60 and the temperature of the coolant at the point where the coolant has passed through the fuel cell stack 10 to be equal to or greater than a predetermined temperature difference.

The cooling fan 50 may be disposed adjacent to the heat exchange device 40, and rotation of the cooling fan 50 causes the ambient air of the heat exchange device 40 to flow, thereby improving cooling performance of the heat exchange device 40. The cooling controller 80 may be configured to adjust the RPM ($RPM_{fan}$) of the cooling fan 50 through PI control. In particular, the cooling controller 80 may be configured to calculate a temperature difference between the temperature of the coolant which has passed through the heat exchange device 40 estimated by the temperature estimator 60 and the temperature of the coolant at the point where the coolant has passed through the fuel cell stack 10 sensed by the second temperature sensor 12.

In other words, the calculated temperature difference may be a temperature difference between the temperature of the coolant at a point before the coolant passes through the heat exchange device 40 and the temperature of the coolant at the point where the coolant has passed through the heat exchange device 40. The calculated temperature difference may be adjusted to be equal to or greater than a predetermined temperature difference. Accordingly, even when a relatively small heat load occurs in the fuel cell stack 10, cooling performance of the heat exchange device 40 may be maintained, and therefore, even if the heat load of the fuel cell stack 10 is changed, the corresponding situation may be rapidly responded to.

In addition, the control system may further include: a cooling pump 22 disposed in the coolant circulation line 20 and configured to circulate the coolant inside the coolant circulation line 20 when operated; and a cooling controller 80 configured to adjust an RPM of the cooling pump 22 based on the temperature of the coolant at the point where the coolant has passed through the fuel cell stack 10. When the temperature of the coolant at the point where the coolant has passed through the fuel cell stack 10 is within a predetermined temperature range, the cooling controller 80 may be configured to adjust the RPM of the cooling pump 22 so that the coolant of the coolant circulation line 20 flows at a predetermined flow rate.

In an exemplary embodiment, when the temperature of the coolant at the point where the coolant has passed through the fuel cell stack 10 is greater than the predetermined temperature range, the cooling controller 80 may be configured to adjust the RPM of the cooling pump 22 to increase the flow rate of the coolant of the coolant circulation line 20. In particular, since the opening degree controller 70 adjusts the opening degree of the temperature adjusting device 30, it may be possible to adjust the temperature of the coolant at the point where the coolant has passed through the fuel cell stack 10. When the temperature of the coolant at the point where the coolant has passed through the fuel cell stack 10 is increased in spite of the adjustment of the opening degree by the opening degree controller 70, the cooling controller 80 may be configured to increase the RPM of the cooling pump 22 to increase the flow rate of the coolant of the coolant circulation line 20.

Referring back to FIG. 2, a control method for fuel cell cooling according to an exemplary embodiment of the present disclosure may include: sensing temperatures of coolants of the coolant circulation line 20 at a point where the coolant flows into a fuel cell stack 10 and at a point where the coolant has passed through the fuel cell stack 10 (S100); estimating a temperature of a coolant of the coolant circulation line 20 which has passed through the heat exchange device 40 at a point before a bypass line 21 which bypasses the heat exchange device 40 joins based on the sensed temperatures of the coolants at the point where the coolant flows into the fuel cell stack 10 and at the point where the coolant has passed through the fuel cell stack 10 (S200); and operating a temperature adjusting device 30 to adjust a ratio between the coolants respectively flowing into the heat exchange device 40 of the coolant circulation line 20 and the bypass line 21 using the estimated temperature of the coolant and the temperature of the coolant flowing into the fuel cell stack 10 (S500).

In the estimating of the temperature of the coolant (S200), the temperature of the coolant at the point where the coolant has passed through the heat exchange device 40 by further using a ratio between the coolants respectively flowing into the heat exchange device 40 of the coolant circulation line 20 and the bypass line 21. In the operating of the temperature adjusting device 30 (S500), a control gain for operating the temperature adjusting device 30 may be set based on the temperature of the coolant at the point where the coolant has passed through the heat exchange device 40 estimated by the temperature estimator 60 (S400), and the temperature adjusting device 30 may be operated to adjust the temperature of the coolant at the point where the coolant flows into the fuel cell stack 10 to reach a predetermined target temperature using the set control gain (S500).

The control gain may be set smaller as the temperature of the coolant estimated by the temperature estimator 60 decreases. Additionally, control gain may be set larger as the temperature of the coolant estimated by the temperature estimator 60 increases. The control method may further include: adjusting RPM of the cooling fan 50 to adjust a temperature difference between the estimated temperature of the coolant and the temperature of the coolant at the point where the coolant has passed through the fuel cell stack 10 to be equal to or larger than a predetermined temperature difference (S300), after estimating the temperature of the coolant (S200). The control method may further include: adjusting the RPM of the cooling pump 22 to circulate the coolant of the coolant circulation line 20 based on the temperature of the coolant at the point where the coolant has passed through the fuel cell stack (not shown), after the sensing of the temperatures of the coolants (S100).

According to the control system and control method for fuel cell cooling of the present disclosure, since the temperature of the coolant which has passed through the heat exchange device is estimated and used to adjust a temperature of the coolant flowing into the fuel cell stack, it may be possible to prevent the temperature of the coolant flowing into the fuel cell stack from being rapidly changed. In addition, durability of the fuel cell stack may be improved by preventing a thermal shock of the fuel cell stack occurring due to a rapid change in the temperature of the coolant. Further, since cooling performance of the heat exchange device is controlled to be maintained even if a relatively small heat load occurs in the fuel cell stack, the change in the heat load of the fuel cell stack may be rapidly handled.

Although the present disclosure has been shown and described with respect to specific exemplary embodiments, it will be apparent to those having ordinary skill in the art that the present disclosure may be variously modified and altered without departing from the spirit and scope of the present disclosure as defined by the following claims.

What is claimed is:

1. A control system for fuel cell cooling, comprising:
   a fuel cell stack into which hydrogen and oxygen flow and which react with each other, and having a cooling flow path in which coolant flows between separators;
   a coolant circulation line connected to the cooling flow path of the fuel cell stack and in which coolant flows;
   a heat exchange device provided in the coolant circulation line and configured to cool coolant of the coolant circulation line through heat-exchange with the outside;
   a bypass line branched from the coolant circulation line at a point before coolant flows into the heat exchange device and joining the coolant circulation line by bypassing the heat exchange device;
   a temperature adjusting device disposed at a point where the bypass line is branched from the coolant circulation line or a point where the bypass line joins the coolant circulation line and configured to adjust a ratio between coolant flowing into the heat exchange device of the coolant circulation line and coolant flowing into the bypass line;
   a temperature estimator configured to estimate a temperature of the coolant of the coolant circulation line at a point before the bypass line joins the coolant circulation line after the coolant passes through the heat exchange device;
   an opening degree controller configured to operate the temperature adjusting device using the temperature of the coolant estimated by the temperature estimator and the temperature of the coolant at a point at which the coolant flows into the fuel cell stack: and
   a cooling pump provided between a coolant inlet of the fuel cell stack and the temperature adjusting device in the coolant circulation line and configured to circulate the coolant inside t coolant circulation line when operate; and a cooling controller configured to adjust a revolutions per minute (RPM) the cooling pump based on the temperature of the coolant at the point where the coolant has passed through the fuel cell stack.

2. The control system of claim 1, further comprising:
a first temperature sensor and a second temperature sensor disposed at a point where a coolant flows into the fuel cell stack of the coolant circulation line and a point where a coolant has passed the fuel cell stack, respectively, and configured to sense a temperature of the coolant.

3. The control system of claim 1, wherein the temperature estimator is configured to estimate the temperature of the coolant using a temperature of the coolant at the point where the coolant flows into the fuel cell stack of the coolant circulation line and at the point where the coolant has passed the fuel cell stack measured by the first temperature sensor and the second temperature sensor, respectively, and a ratio between the coolant flowing into the heat exchange device and the coolant flowing into the bypass line.

4. The control system of claim 1, wherein the temperature adjusting device is an electronic thermostat, the ratio between the coolant flowing into the heat exchange device and the coolant flowing into the bypass line and mixed is varied by adjusting an opening degree, and the ratio of the coolant passing through the heat exchange device increases as the opening degree is increased.

5. The control system of claim 1, wherein the opening degree controller is configured to set a control gain for operating the temperature adjusting device based on the temperature of the coolant at the point where the coolant has passed through the heat exchange device estimated by the temperature estimator, and operate the temperature adjusting device using the set control gain to adjust the temperature of the coolant flowing into the fuel cell stack to reach a predetermined target temperature.

6. The control system of claim 5, wherein the opening degree controller is configured to set the control gain to be smaller as the temperature of the coolant estimated by the temperature estimator decreases.

7. The control system of claim 5, wherein the opening degree controller is configured to set the control gain to be larger as the temperature of the coolant estimated by the temperature estimator increases.

8. The control system of claim 1, further comprising:
a cooling fan rotated to cause ambient air of the heat exchange device to flow,
wherein the cooling controller is configured to adjust revolutions per minute (RPM) of the cooling fan to adjust a temperature difference between the temperature of the coolant estimated by the temperature estimator and the temperature of the coolant at the point where the coolant passes through the fuel cell stack to be equal to or greater than a predetermined temperature difference.

9. A control method for fuel cell cooling, comprising:
sensing, by a controller, temperatures of coolants of the coolant circulation line at a point where the coolant flows into a fuel cell stack and at a point where the coolant has passed through the fuel cell stack;
estimating, by the controller, a temperature of a coolant of the coolant circulation line which has passed through the heat exchange device at a point before a bypass line which bypasses the heat exchange device joins based on the sensed temperatures of the coolants at the point where the coolant flows into the fuel cell stack and at the point where the coolant has passed through the fuel cell stack;
operating, by the controller, a temperature adjusting device configured to adjust a ratio between the coolants respectively flowing into the heat exchange device of the coolant circulation line and the bypass line using the estimated temperature of the coolant and the temperature of the coolant flowing into the fuel cell stack; and
adjusting, by the controller, revolutions per minute (RPM) of a cooling pump provided between a coolant inlet of the fuel cell stack and the temperature adjusting device and circulating coolant of the coolant circulation line based on the temperature of the coolant at the point where the coolant has passed through the feel cell stack, after sensing temperatures of the coolants.

10. The control method of claim 9, wherein the estimating of the temperature of the coolant includes estimating, by the controller, the temperature of the coolant at the point where the coolant has passed through the heat exchange device further using the ratio between the coolants respectively flowing into the heat exchange device of the coolant circulation line and the bypass line.

11. The control method of claim 9, wherein the operating of the temperature adjusting device includes setting, by the controller, a control gain for operating the temperature adjusting device based on the temperature of the coolant at the point where the coolant has passed through the heat exchange device estimated by the temperature estimator, and operating the temperature adjusting device using the set control gain to adjust the temperature of the coolant flowing into the fuel cell stack to reach a predetermined target temperature.

12. The control method of claim 11, wherein the control gain is set to be smaller as the temperature of the coolant estimated by the temperature estimator decreases.

13. The control method of claim 11, wherein the control gain is set to be larger as the temperature of the coolant estimated by the temperature estimator increases.

14. The control method of claim 9, further comprising:
adjusting, by the controller, revolutions per minute (RPM) of a cooling fan to adjust a temperature difference between the estimated temperature of the coolant and the temperature of the coolant at the point where the coolant passes through the fuel cell stack to be equal to or greater than a predetermined temperature difference, after estimating the temperature of the coolant.

\* \* \* \* \*